(12) United States Patent
Frustaci et al.

(10) Patent No.: US 6,420,066 B1
(45) Date of Patent: Jul. 16, 2002

(54) VARIABLE DENSITY CATHODE ASSEMBLY WHICH FACILITATES WINDING

(75) Inventors: Dominick J. Frustaci, Williamsville; Tina L. Urso, East Amherst; Paul T. Hallifax, Gasport, all of NY (US)

(73) Assignee: Wilson Greatbatch Ltd., Clarence, NY (US)

(*) Notice: Subject to any disclaimer, the term of this patent is extended or adjusted under 35 U.S.C. 154(b) by 33 days.

(21) Appl. No.: 09/609,949

(22) Filed: Jul. 3, 2000

(51) Int. Cl.$^7$ ................................................. H01M 4/00
(52) U.S. Cl. ........................ 429/94; 429/233; 429/209; 429/164; 29/623.1
(58) Field of Search ........................ 429/94, 233, 209, 429/164; 29/623.1

(56) References Cited

U.S. PATENT DOCUMENTS 3,663,721 A   5/1972 Blondel et al.
6,051,038 A * 4/2000 Howard et al. ............ 29/623.1
6,232,012 B1 * 5/2001 Howard et al. ............ 429/129

FOREIGN PATENT DOCUMENTS

EP   0 975 041 A2   1/2000

OTHER PUBLICATIONS

Patent Abstract of Japan: Japan Storage Battery Co. Ltd., Nonaqueous Electrolyte Battery Publication No. 2000090981, Publication date: Mar. 31, 2000.

* cited by examiner

*Primary Examiner*—Laura Weiner
(74) *Attorney, Agent, or Firm*—Hodgson Russ LLP

(57) ABSTRACT

An electrode assembly constructed of continuous anode and cathode electrodes that are overlaid in overlapping fashion and wound into a cell stack suitable for prismatic or other non-cylindrically-shaped cases. The cathode electrode strip has some regions where the electrode material is pressed to a high density and has some regions where the active material is pressed to a lower density, such that the lower density regions correspond to the bend regions in the wound cell stack.

11 Claims, 3 Drawing Sheets

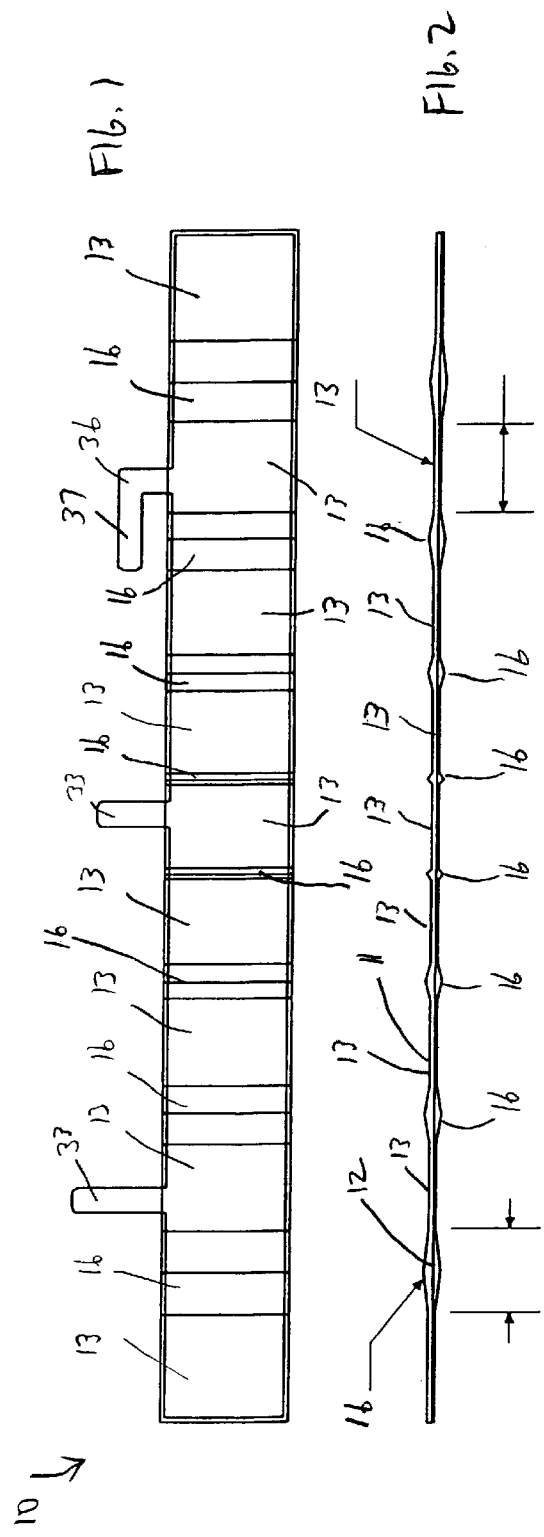

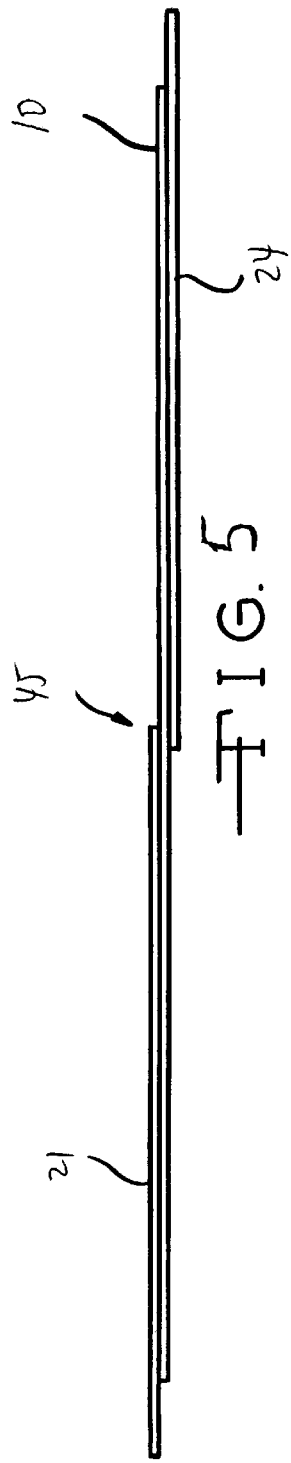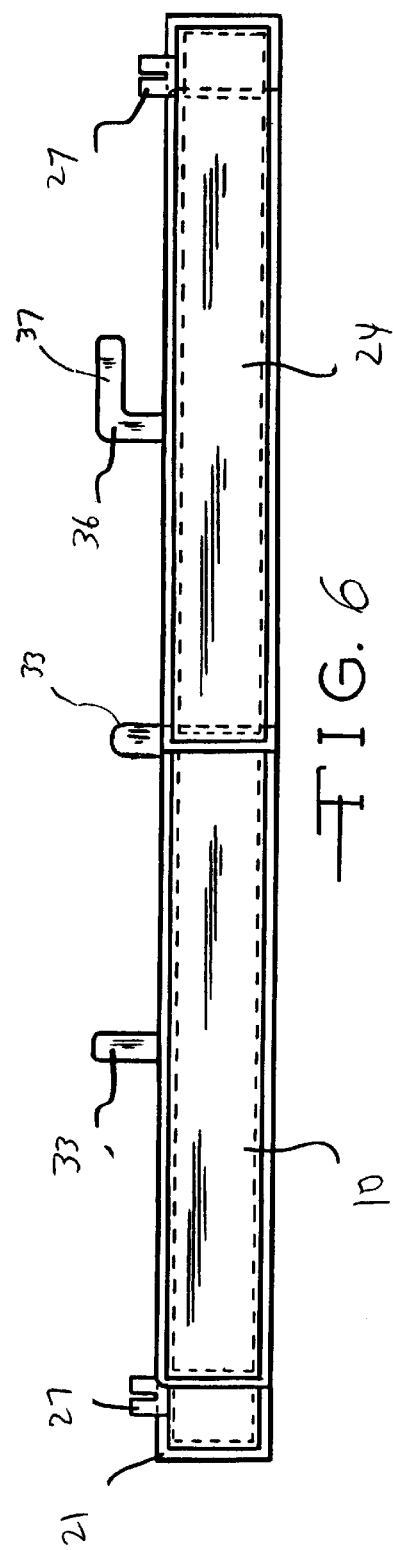

VARIABLE DENSITY CATHODE ASSEMBLY WHICH FACILITATES WINDING

FIELD OF INVENTION

The present invention generally relates to the art of electrochemical energy, and more particularly, to an electrode assembly, electrochemical cells in which the electrode assembly is used and a method for making the electrode assembly.

BACKGROUND OF THE INVENTION

Batteries or electrochemical cells are typically volumetrically constrained systems which cannot exceed the available volume of the battery case. The size and resulting volume of the battery case are dictated by the space requirements available for the particular application. The components that make up a battery namely, the cathode electrode, the anode electrode, the separator, the current collectors, and the electrolyte all have to fit into the limited space defined by the battery case. Therefore, the arrangement of the components impacts on the volume of electrode active material that can fit into the case and the ease of manufacturing the unit.

Some typical electrode assemblies that attempt to maximize volumetric efficiency include the "Z" folded electrode assembly which is disclosed in U.S. Pat. No. 3,663,721 to Blondel et al. In the "Z" folded electrode, a unitary and continuous lithium anode is folded back and forth in a zig-zag fashion. The length of the individual folds determines the width of the electrode assembly. Individual cathode plates are positioned between pairs of the pleated anode electrode and electrically connected to one another. The design has some drawbacks including the requirement that separate cathode plates be inserted between each pair of adjacent layers of anode electrode, and the requirement that electrical connections be made between all of the inserted cathode plates. This arrangement increases the time and costs associated with manufacturing.

Another typical volumetrically efficient electrode assembly configuration is the "jelly roll" design in which the anode electrode, the cathode electrode, and the separator are overlaid with respect to each other and wound into a coil. Such a wound electrode configuration is desirable because the continuous anode and cathode electrodes require a minimal number of mechanical connections to their respective terminal leads, and the jelly roll type assembly is generally recognized as preferred for high discharge and current pulse applications. Use of the winding method, however, often limits the density of the electrodes because as an electrode is pressed more densely to its current collector it becomes more brittle and has a greater tendency to crack and flake off the screen especially when wound about a small radius bend. Also, the electrode material may delaminate along the length of the electrode causing the material to lose contact with the current collector screen.

Because stacked or flat folded cathode plates as described above do not create the stresses in the bend regions that are associated with winding, the plate method has been able to accommodate higher density electrodes and therefore has traditionally provided a cell stack of higher total electrode weight and capacity than is possible using the wound method.

What is needed is an improved wound cell stack with a relatively high density electrode for use in a prismatic (cuboid-shaped) or other non-cylindrical case.

SUMMARY OF THE INVENTION

The present invention meets the above-described need by providing a wound electrode having some regions where the electrode material is pressed to a high density and having some regions where the active material is pressed to a lower density.

The wound electrode has some regions that lie in the "flat" and some regions that are curved. Moving from the inside of the wound stack to the outside of the stack, the bend regions have increasing radii. The flat regions and the bend regions with a longer radius curve are pressed to a high density similar to a cell stack formed from the plate method. In bend regions making relatively "tight" or short radius turns, the active material is pressed to a lower density to accommodate the stresses associated with the bending during the formation of the cell stack.

In a preferred embodiment, a wound electrode cell stack has electrode material pressed to a lower density in the regions corresponding to the shorter radius turns. The tool that presses the active material to the current collector is shaped such that alternating high density and low density regions are located on both sides of the current collector screen.

The present invention also includes a method of manufacturing a wound cell stack as described above. The method includes the steps of simultaneously pressing the electrode active material onto the current collector screen to a high density in some regions and to a low density in other regions. The location of the low density regions is predetermined such that when the anode and cathode electrodes are wound into a cell stack the low density regions correspond to the regions where the shortest radius curves are formed in the wound cell stack.

To assemble the cell stack, the cathode electrode is placed in alignment with the anode electrodes and the combination is then wound as described below.

BRIEF DESCRIPTION OF THE DRAWINGS

FIG. 1 is a plan view of a cathode electrode strip of the present invention;

FIG. 2 is a side elevation view of the cathode electrode strip of FIG. 1;

FIG. 3 is a plan view of a first anode electrode;

FIG. 4 is a plan view of a second anode electrode;

FIG. 5 is a side elevational view of the combined cathode and anode electrode strips prior to winding;

FIG. 6 is a plan view of the combined cathode and anode electrode strips prior to winding; and, FIG. 7 is a side elevational view of the wound cell stack with high density and low density regions in the cathode electrode.

DETAILED DESCRIPTION OF THE INVENTION

Figure 7:
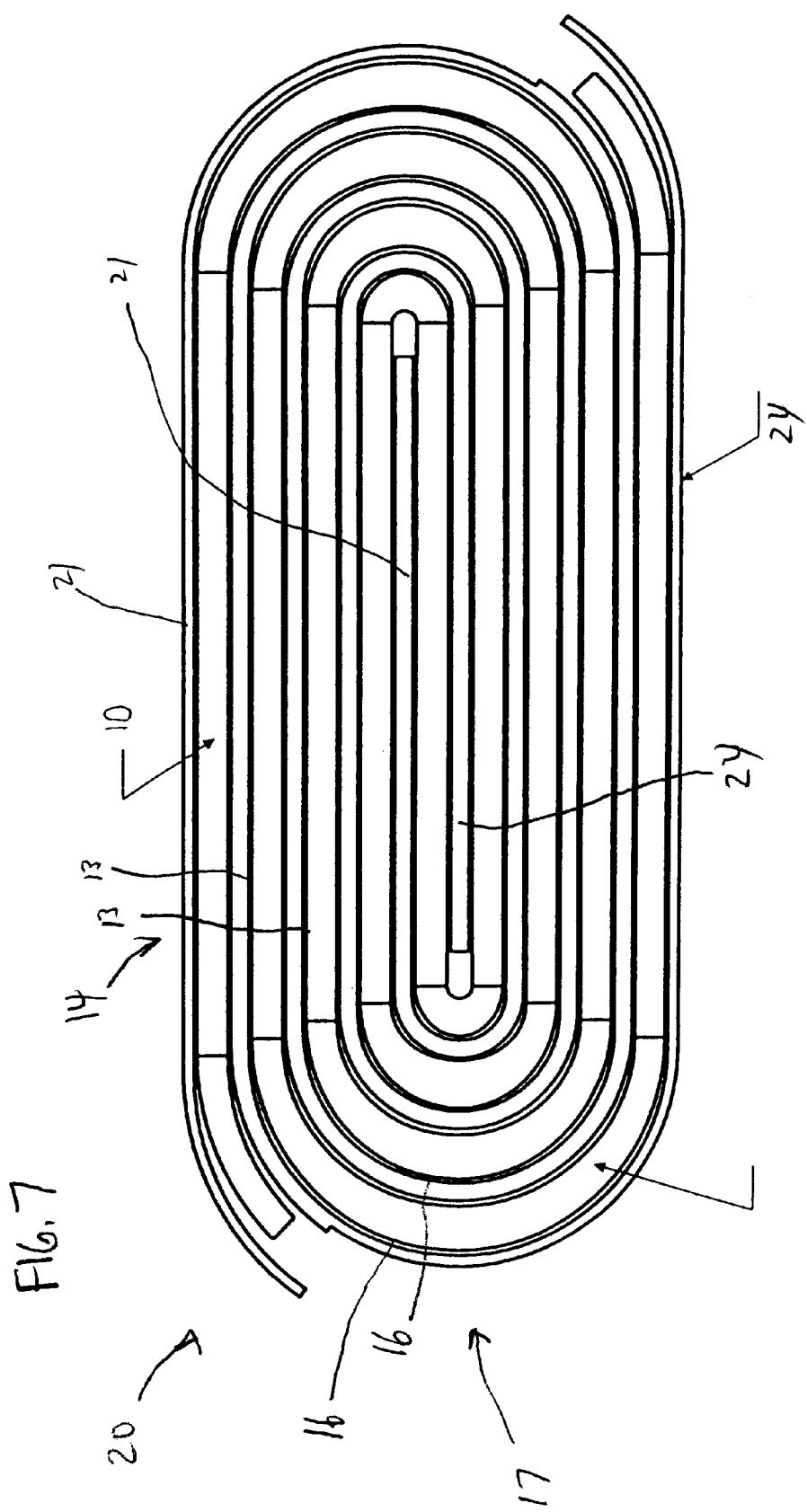

The present invention is designed for high energy devices such as batteries and capacitors and is adaptable in a wide variety of electrode configurations and shapes for such applications as capacitors and batteries including aqueous and nonaqueous primary and secondary batteries.

In FIG. 1, a cathode electrode 10 is shown. The cathode electrode 10 is preferably formed from a continuous strip of active material 11 contacting a conductive member serving as a cathode current collector 12. The active material 11 is pressed onto the current collector 12 through a process that is known to those of ordinary skill in the art. The active material 11 is preferably a metal, a metal oxide, a metal sulfide, a mixed metal oxide or a carbonaceous material. The cathode current collector 12 is preferably comprised of conductive material such as of a conductive screen and the like. The cathode electrode 10 has a plurality of flat regions 13 that correspond to the flat regions 14 shown in the final wound cell stack 20 (FIG. 7). The electrode 10 also has a plurality of bend regions 16 that correspond to the bend regions 17 in the final wound cell stack 20. Starting at the left end of the cathode electrode strip the flat regions 13 are disposed such that there is a bend region 16 between each successive flat region 13. The bend regions 16 become progressively shorter toward the center of the electrode strip 10. The most centrally located bend regions 16 correspond to the shortest radius curves in the final wound cell stack 20. The shortest radius curves in the wound cell stack 20 generate the greatest stresses. When these sections are curved during the winding process, the material 11 on the inside of the strip 10 is compressed and the material 11 on the outside of the strip 10 is placed under tension. Accordingly, the sharpest or tightest (smallest radius) sections are most likely to cause failures manifested by flaking off or separation from the current collector screen (delamination).

Accordingly, referring to FIG. 2, the bend regions 16 are the regions that are most in need of relief from the stresses associated with winding. As a result the bend regions 16 have cathode active material 11 pressed at a lower density. The material 11 is pressed to a high density in the regions 13 that correspond to the flat sections 14 of the wound stack 20. The regions 16 where the material 11 has been pressed to a lower density are capable of bending without flaking or delaminating due to the curvature. These regions 16 are created by a modified press (not shown) that is capable of pressing different regions of the cathode electrode 10 at different densities according to the pattern best shown in FIG. 2.

Once the cathode electrode 10 is provided with the high and low density regions 13, 16 respectively, a separator (not shown) and a pair of anode electrode strips 21 and 24 (FIGS. 3–4) are placed in alignment with the cathode electrode strip 10. The anode strips 21, 24 have regions 22 and 25 that correspond to the flat regions 14 of the final wound stack 20 and have regions 23, 26 that correspond to the bend regions 17 of the final cell stack 20. While it is not a requirement, the anode electrodes 21, 24 may also be pressed to a lower density in bend regions 23, 26. The anode electrodes 21, 24 have connectors 27 for connecting to the case in a case negative design as known to those of ordinary skill in the art. The combined anode strip, electrode strip, and separator are then overlayed as shown in FIGS. 5–6. Next, the electrodes are wound around a mandrel disposed in the center 45 of the combined strips as shown and described in copending patent application Ser. No. 09/262,245 entitled Wound Stack for Enhanced Battery Performance, which is assigned to the assignee of the present invention and which is incorporated herein by reference.

Returning to FIG. 1, the electrode assembly 10 also has electrical connectors 33 and 36 for connecting to the case and/or the terminal pin. The connector 36 has an elongate section 37 for connecting to the terminal pin as shown and described in U.S. Pat. No. 5,750,286 to Muffoletto et al., which is assigned to the assignee of the present invention and which is incorporated herein by reference.

It will be readily apparent to those of ordinary skill in the art to which the invention pertains that a "jelly roll" configuration could also be used. For the jelly roll configuration, a unitary anode strip that is approximately the same length as the cathode electrode would be overlayed with the cathode electrode with a separator between. The combined electrodes would then be wound about a mandrel from one end to the other end as known to those of ordinary skill in the art. The low density regions would be disposed in the areas corresponding to the tightest curves in the final wound cell produced according to the jelly roll method.

Turning to FIG. 7, the wound cell stack 20 of the present invention includes continuous anode and cathode electrodes (10, 21, 24) wound such that they are disposed in flat regions 14 and bend regions 17. The flat regions 14 correspond to regions 13 of the cathode electrode where the electrode active material 11 is pressed to a high density comparable to the densities used with flat folded electrode assemblies. The bend regions 17 correspond to the regions 16 of the cathode assembly 10 where electrode active material 11 has been pressed to a low density on the current collector screen 12 to facilitate the winding of the cell stack 20. These low density regions 16 facilitate the winding of the cell stack 20 by preventing delamination from occurring along the longitudinal axis of the cathode electrode 10. If low density regions 16 are not provided, the electrode active material 11 may start to peel away from the cathode current collector 12 in the bend regions 17 and spread down the longitudinal axis into the straight regions 14. The discontinuity provided by the regions 16, where the electrode active material is pressed to a lower density, prevents the delamination from developing.

The present invention provides several advantages. By utilizing continuous anode and cathode electrode strips, the device provides for elimination of the extra connections for "like" plates associated with some of the plate designs. These extra connections do not contribute to the capacity or surface area of the active materials. The present invention also provides for a cell with a higher capacity than a cell stack constructed of all high density plates or one constructed of uniformly low density wound elements. Also, the present invention provides for bending of the electrode without cracking of the active material in the tight bend regions. The present invention increases the capacity density of the cell by about ten percent or more depending on the case aspect ratio.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. An electrode assembly, comprising:

an anode electrode having an anode current collector provided with an anode active material contacted thereto;

a cathode electrode having a cathode current collector provided with a cathode active material contacted thereto, the cathode electrode having first regions where cathode active material is pressed to a first density on the cathode current collector, the cathode electrode having second regions where the cathode active material is pressed to a second density which is lower than the first density, the regions being located along the cathode electrode such that, when the anode electrode and the cathode electrode are wound around each other to form a wound cell stack having straight regions and bend regions, the second regions of the cathode electrode being located in at least one of the bend regions of the wound cell stack; and, a layer of an insulating separator material disposed between the anode electrode and the cathode electrode.

2. The electrode assembly of claim 1, wherein the cathode active material is pressed to a lower density in second regions corresponding to the bend regions in the wound cell stack having the shortest radii.

3. The electrode assembly of claim 1, wherein the anode electrode has first regions where anode active material is pressed to a first density and has second regions where anode active material is pressed to a second lower density, the regions being located along the strip such that, when the anode electrode and the cathode electrode are wound around each other to form a wound cell stack, the second regions are located in at least one of the tightest bend regions of the wound cell stack.

4. The electrode assembly of claim 1, wherein the anode electrode comprises two anode electrode strips that are placed on opposite sides of the cathode electrode strip prior to winding.

5. A battery, comprising:
- an anode electrode having an anode current collector provided with an anode active material contacted thereto;
- a cathode electrode having a cathode current collector provided with a cathode active material contacted thereto, the cathode electrode having first regions where cathode active material is pressed to a first density on the cathode current collector, the cathode electrode having second regions where the cathode active material is pressed to a second density which is lower than the first density, the regions being located along the cathode electrode such that, when the anode electrode and the cathode electrode are wound around each other to form a wound cell stack having straight regions and bend regions, the second regions of the cathode electrode being located in at least one of the bend regions of the wound cell stack;
- a separator disposed between the anode electrode and the cathode electrode; and,
- an electrolyte activating and operatively associating the anode electrode and the cathode electrode.

6. The battery of claim 5, wherein the anode electrode has first regions where the anode active material is pressed to a first density and has second regions where the active material is pressed to a second density which is lower than the first density, the second regions being located along the strip such that, when the anode electrode and the cathode electrode are wound around each other to form a wound cell stack, the second regions are located in the bend regions of the wound cell stack.

7. The battery of claim 6, wherein the anode electrode comprises two anode electrode strips that are placed on opposite sides of the cathode electrode strip prior to winding.

8. A method of forming an electrode assembly, comprising the steps of:
- providing at least one anode electrode strip with an anode current collector having anode active material contacted thereto;
- providing an elongate continuous cathode electrode having a cathode current collector having cathode active material contacted thereto, the cathode active material being contacted to the current collector strip at a first density in a first region and in a second density in a second region, the second density being lower than the first density, the first and second region being positioned such that the regions are located along the strip such that, when the anode electrode and the cathode electrode are wound around each other to form a wound cell stack, the second regions are located in at least one of the bend regions of the wound cell stack.

9. The method of claim 8, wherein the cathode active material is pressed to a lower density in regions corresponding to the bend regions in the wound cell stack having the shortest radii.

10. The method of claim 8, wherein the anode electrode has first regions where anode active material is pressed to the anode current collector at a first density and has second regions where the anode active material is pressed to the anode current collector at a second density which is lower than the first density, the regions being located along the electrode such that, when the anode electrode and the cathode electrode are wound around each other to form a wound cell stack, the second regions are located in the bend regions of the wound cell stack.

11. The electrode assembly of claim 10, wherein the anode electrode comprises two anode electrode strips that are placed on opposite sides of the cathode electrode strip prior to winding.

* * * * *